July 17, 1928.
V. JESSEN
1,677,718
DEVICE FOR ACTUATING THE COUPLING AND THE BRAKE IN AUTOMOBILES
Filed Nov. 26, 1926   2 Sheets-Sheet 1
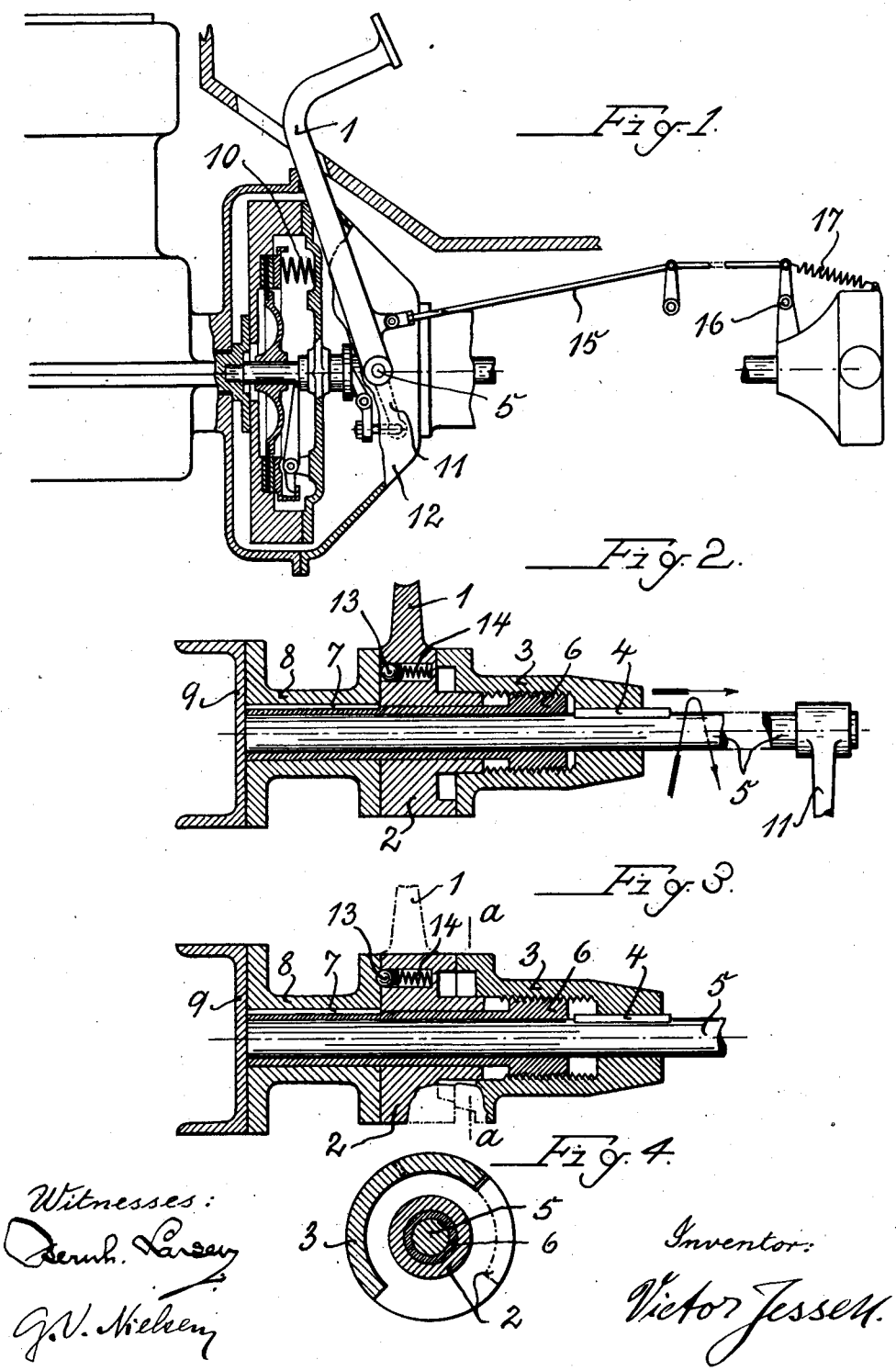

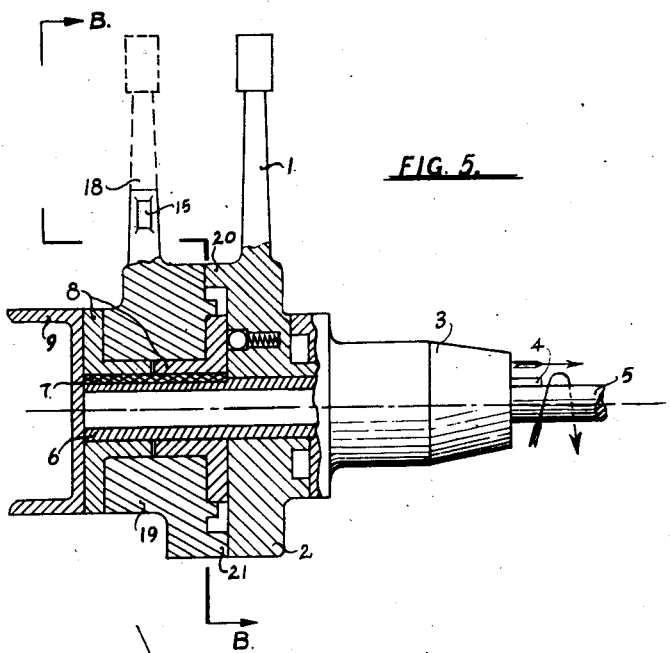
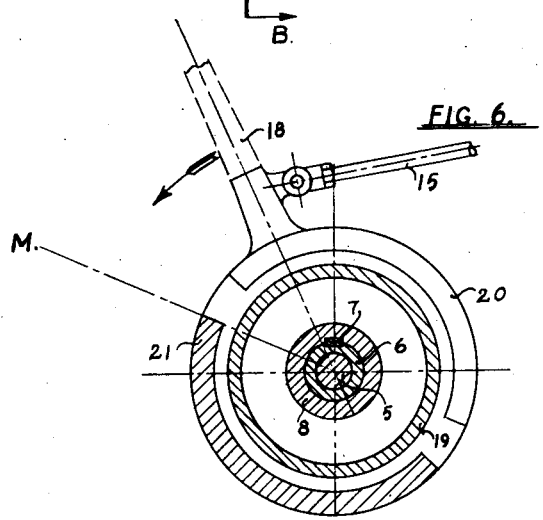

Patented July 17, 1928.

1,677,718

UNITED STATES PATENT OFFICE.

VICTOR JESSEN, OF COPENHAGEN, DENMARK.

DEVICE FOR ACTUATING THE COUPLING AND THE BRAKE IN AUTOMOBILES.

Application filed November 26, 1926. Serial No. 150,972.

As is well-known the coupling and the brake in automobiles usually are operated by separate pedals.

My invention relates to a device connecting the coupling and the brake in such a manner that, independently of one another or immediately after another, they can be acted upon by means of the same pedal, without needing to be altered or displaced, nor to be specially chosen or new constructed.

In the accompanying drawing my invention is illustrated in connection with a coupling and a brake of well-known kind.

Figure 1 shows the total arrangement, in side view, partly in section,

Figs. 2 and 3 the device itself in different positions, on a larger scale,

Fig. 4 the same in section by the line a—a, Fig. 3,

Fig. 5 a modified pedal arrangement and Fig. 6 the same in section by the line B—B, Fig. 5.

The pedal-arm 1 according to my invention is connected with one half 2 of a claw-coupling, the other half part of which being shaped as a ring 3, that by a groove-connection 4 can be displaced on the coupling shaft 5. About the shaft 5 is placed a muff 6, which in one end is screw-cut, corresponding to an interior screw-cut part of the ring 3, and in the other end, by a groove-connection 7 or the like firmly lodged in a guide 8 placed for instance on the side 9 of the car, the coupling part 2 being lodged about in the middle of the muff 6.

The coupling parts 2 and 3 are placed thus in relation to one another that they engage with another, when the carriage shaft is coupled to the motor, and the pedal-arm 1, under influence of a spring 10 belonging to the coupling, occupies its backwards slanting position. In this position the pedal-arm, by the claw-coupling, is connected with the shaft 5.

When the pedal-arm against the action of the spring 10 is pressed forward by the foot, the bar-connection 11 of the coupling disconnects the pressure-disk, and at the same time the shaft 5 is turned owing to the engagement of the claw-coupling parts 2 and 3, the shaft 5 being lodged in the mantle 12 of the coupling. By the turning of the shaft 5 the coupling part 3 is displaced in the direction of the arrow, till it gets out of engagement with the part 2, Figs. 3 and 4, and the motor-coupling is disconnected. That disconnection has taken place, is felt by the restraining effect of a little ball 13, which being lodged in the part 2 and influenced by a spring 14 engages with a corresponding groove in the guide 8. The pedal-arm occupies then its middle position, in which it is disconnected from the shaft 5, the motor coupling being inactive, and the brake uninfluenced, from which position the pedal-arm, if released, can be brought back by the spring 10. If on the contrary the pressure on the pedal-arm 1 in forward going direction is continued, the engagement of the ball 13 or of another weakly binding organ with the guide 8 is disconnected and the brake-bar 15, which is connected with the pedal-arm 1, by bar-connections will influence the brake-shaft 16 and thus the brake itself, the pedal-arm 1 turning loosely about the shaft 5.

The pedal-arm 1, being released, then under influence of a spring 17 belonging to the brake will be brought back to the middle position, whereafter the shaft 5 under the action of the spring 10 will be turned and at the same time the ring 3 be displaced in a direction opposite to the arrow until engagement with the coupling part 2 is obtained and the pedal-arm occupies its backwards slanting position so that the motor-coupling again is put into activity. In order to cause the parts 2 and 3 to enter into engagement in a smoothly gliding manner, their respective surfaces are cut aslant as shown in Fig. 3.

By using my device the result is obtained that, by one foot, disconnection of the motor-coupling and braking can take place immediately after one another, and that the coupling can be operated independently of the brake, without any risk of the motor stopping, as wrong handling cannot be thought of.

My device may be varied in details, without departing from the principle of my invention.

In a modification the brake-bar 15, instead of being directly connected with the pedal-arm 1, can in its outer end be connected with a coupling shaped portion 19 lodged on the I-shaped portion 8 and thus that the tooth 21 on said coupling shaped part 19 is suitably guided in front of the middle position of the pedalarm 1, so that the brake-bar 15 (by the coupling 19) is acted upon by the claw-coupling 2, on which the tooth 20 is located and turned by the pedalarm 1, not until said pedalarm, after having passed the middle position "M", Fig. 6 is moved further on in forward going direction.

If the carriage is intended for driving in a hilly ground, it can be provided with a separate pedal 18 for actuating the brake only, and for instance being placed on the said coupling shaped part 19.

Having thus described my invention I claim:

1. A device for actuating the coupling and the brake in automobiles comprising means for connecting the pedalarm of the motor-coupling with the brake-bar of the brake, a coupling shaft and means for connecting the said pedalarm with the said coupling-shaft during the operation of the motor-coupling and for disconnecting it from the said shaft for operating the brake.

2. In devices for actuating the coupling and the brake in automobiles, the combination by means for connecting the pedalarm of the motor-coupling with the brake-bar, and of a coupling shaft, with a claw-coupling, one part of which being connected with the said pedalarm and lodged on a fixed muff, having a threaded part and surrounding the said coupling-shaft, while the other part of the said claw-coupling having a threaded inner portion surrounds the said muff, and is adapted to be displaced in longitudinal direction, when the said coupling-shaft is turned substantially as set forth for the purpose specified.

3. In devices for actuating the coupling and the brake in automobiles, the combination of means for connecting the pedalarm of a motor-coupling with the brake-bar, with a claw-coupling, one part of which, being connected with the said pedalarm, is furnished with a weakly binding locking organ which, when the pedalarm occupies its middle position and the engagement with the other part of the claw-coupling is released, makes a restraining effect without preventing the pedalarm from being turned for operating the brake, while the pedalarm is brought back by the springs belonging to the motor-coupling and the brake, substantially as set forth.

In witness whereof I have hereunto set my hand.

VICTOR JESSEN.